Feb. 16, 1926. 1,573,785

J. F. ALBRIGHT

FISH LADDER

Filed August 13, 1925 2 Sheets-Sheet 1

Inventor
John F. Albright
by Harold Ramsey
Attys

Feb. 16, 1926.

J. F. ALBRIGHT

FISH LADDER

Filed August 13, 1925    2 Sheets-Sheet 2

1,573,785

Inventor:
John. F Albright
Geisler+Ramsey
by Atty.

Patented Feb. 16, 1926.

1,573,785

UNITED STATES PATENT OFFICE.

JOHN F. ALBRIGHT, OF OREGON CITY, OREGON.

FISH LADDER.

Application filed August 18, 1925. Serial No. 50,021.

*To all whom it may concern:*

Be it known that I, JOHN F. ALBRIGHT, a citizen of the United States, and a resident of Oregon City, county of Clackamas, and State of Oregon, have invented certain new and useful Improvements in Fish Ladders, of which the following is a specification.

The object of my invention is to provide a runway, or fish ladder, by which fish may be lifted over a dam, falls, or other obstruction in a stream, and placed upstream a sufficient distance so that they will not be carried back over said obstruction by the current of the stream above the same. In this way fish will be permitted to pass obstructions on their way upstream and thus power sites may be utilized which formerly were prohibited because they would serve to cut fish off from their spawning grounds upstream.

A further object of my invention is to provide conveying or lifting devices, in a fish ladder of this character, which serve to lift bodily the fish from a point below and downstream, relatively to said obstruction, to a point above and upstream, thereof.

A further object of my invention is to arrange said conveying and lifting devices so that they will not injure the fish, will be flooded with water so that the fish will not become dry, and also will be actuated by the velocity of the water passing over said obstruction.

The details of construction and mode of operation of my devices are hereinafter described with reference to the accompanying drawings, in which.

Figure 1:
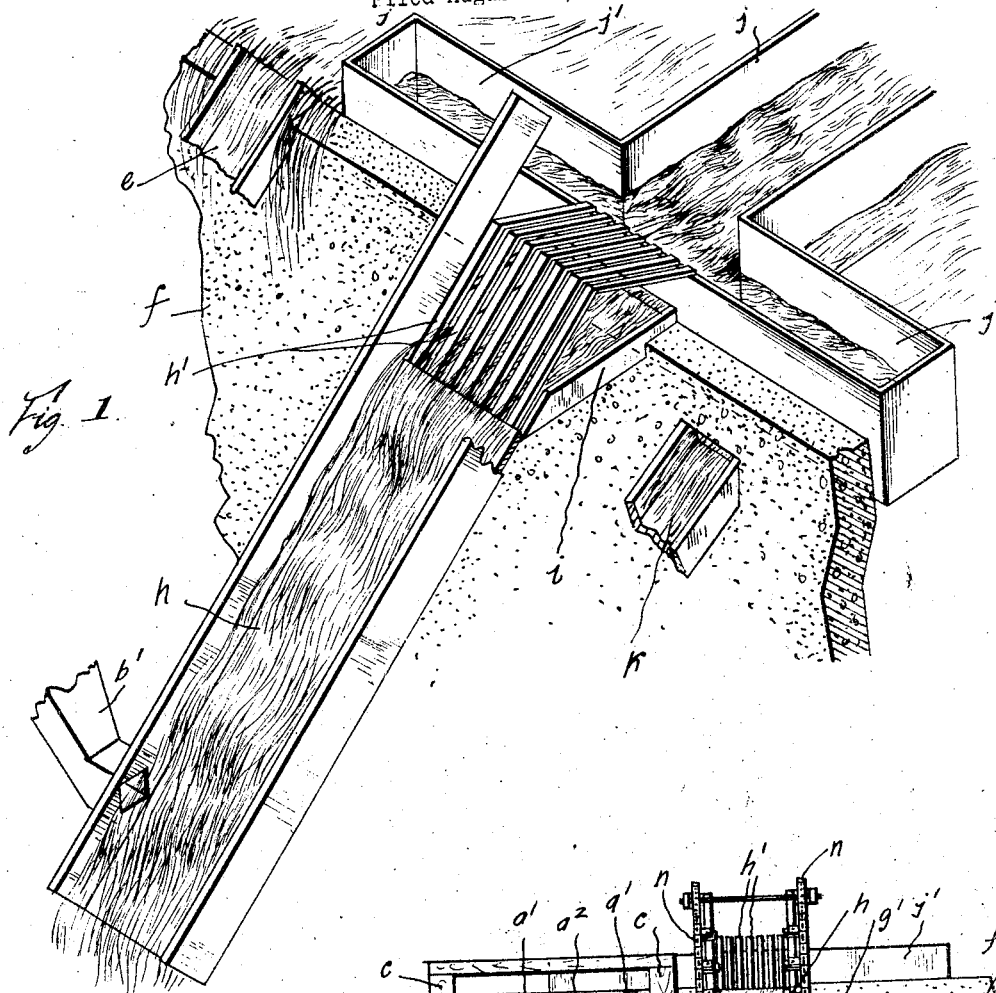
Fig. 1 is a perspective view of a portion of a dam and the chute portion of my ladder, up which fish are lifted.
Figure 2:
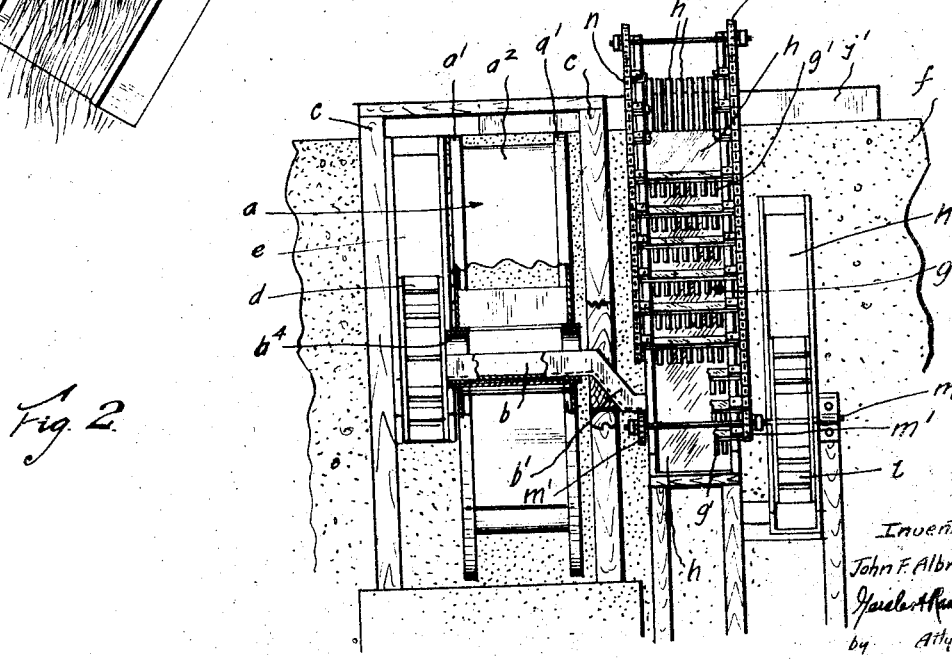
Fig. 2 is an elevation of the device embodied in my fish ladder, a portion broken away to disclose details of construction.
Figure 3:
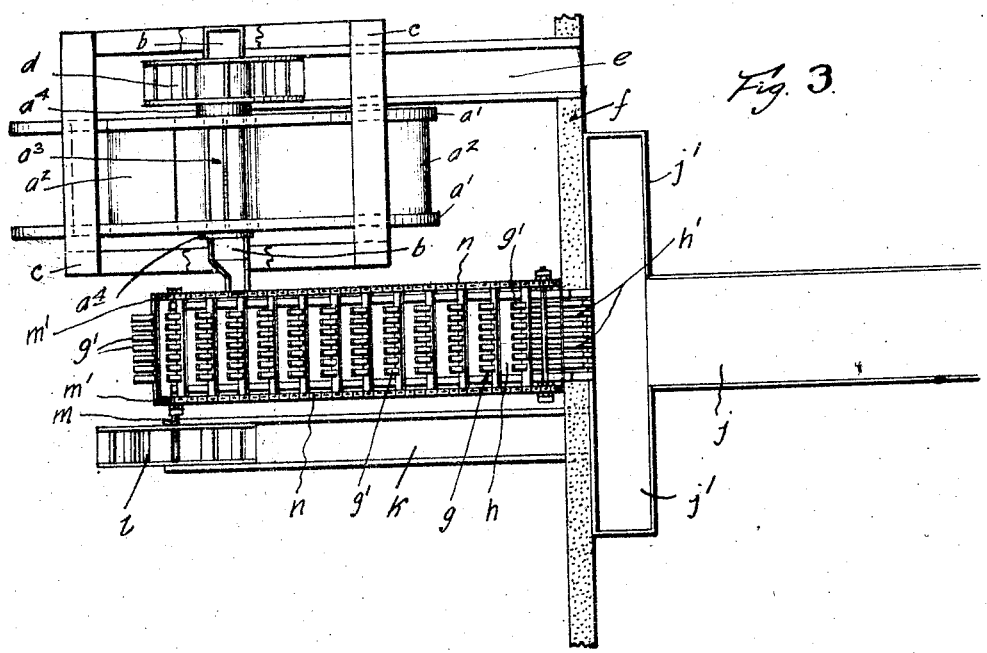
Fig. 3 is a plan view of my improved fish ladder and a portion of the dam over which the ladder is adapted to lift fish.
Figure 4:
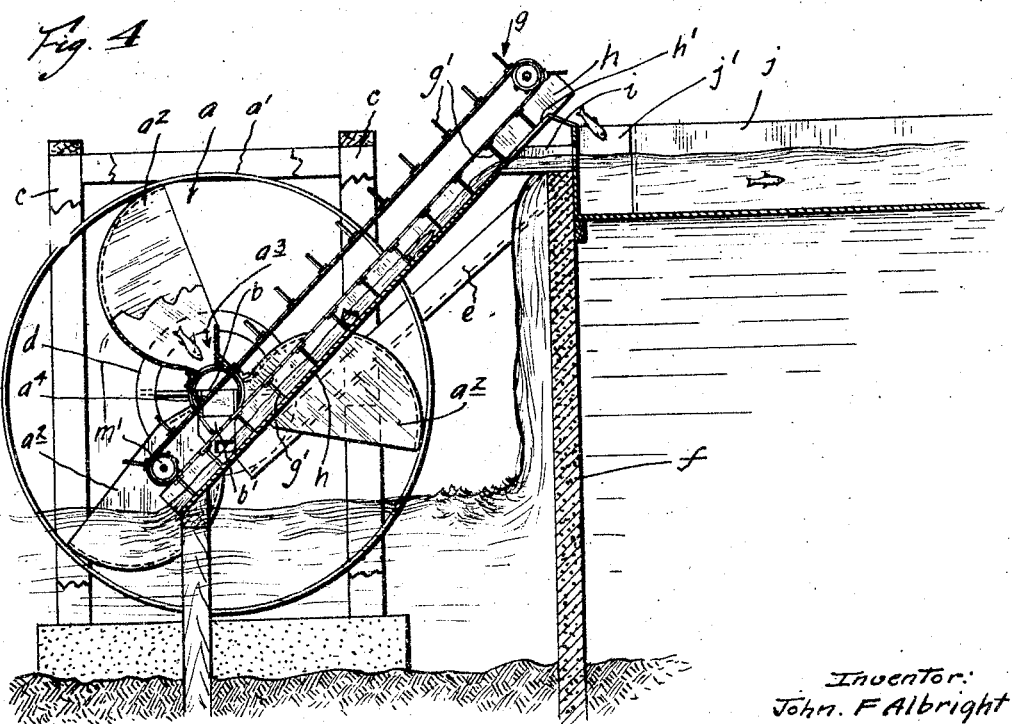
Fig. 4 is a transverse section through the dam, showing the relative arrangement of my improved devices.

My improved fish ladder comprises a standard fish wheel $a$, having a rim section $a'$ and a plurality of buckets $a^2$ arranged radially in said wheel, thus constituting peripheral inlets for water and fish to be lifted. Each bucket $a^2$ is provided with a discharge outlet $a^3$ which empties into an axially arranged trough $b$ which also constitutes an axial bearing for said wheel. Said trough is mounted horizontally between two side frames $c$ upon which said devices are mounted. Said wheel $a$ is provided with a tubular hub $a^4$ which extends out beyond the sides of the wheel, as shown in Fig. 3, and is adapted to be connected to a source of power, preferably a water wheel $d$ which is rotated by the fall of water through the power chute $e$, said water thus having a fall equal to the height of the dam. If the water has not sufficient head, an electrical or mechanical power device can be provided for turning said wheel and also a water wheel might be provided on said tubular extension $a^4$, which would be turned by the velocity of the stream below the falls, if said type of power devices seemed more desirable from the location of the ladder. Said frames $c$ are arranged below the top of the obstruction over which the fish are to be lifted, said obstruction being shown as a dam $f$.

The buckets $a^2$ serve to lift the fish a distance equal to the radius of said wheel and said fish are carried further by paddle-like conveyors $g$ which are arranged in a fish chute $h$. Said trough $b$ is arranged to discharge into said chute $h$, being provided with an offset portion $b'$. Said paddle-like conveyors $g$ preferably comprise a plurality of fingers $g'$ spaced apart so as to permit water to flow between them, said chute $h$ being provided with a water inlet $i$ so that fish being lifted up stream will always be at least partially submerged in water. The portion $h'$ of said fish chute above said water inlet $i$ is formed of a plurality of slats so as to permit water to pass therethrough, said slats extending upwardly so that the fish are dropped into the continuation $j$ of said chute from above the water line. This tends to eliminate the necessity of causing them to swim against the current of the stream in said continuation $j$ as soon as they are dropped from off said conveyor paddles.

Said continuation $j$ in said chute terminates in a T-shaped head $j'$ which is substantially imperforate, except directly in front of said portion $i$. Thus said head $j'$ of said continuation provides a pool of substantially still water in which the fish are released. Said continuation $j$ of said chute is arranged so as to enter the stream a substantial distance above said obstruction and preferably at a point at which the current is not unusually swift so that the fish will not be suddenly released into a fast moving stream of water which would tend to wash them down stream. The relative arrangement of said extension of said chute thus is arranged to prevent the fish from being driven back over the dam by the swift running water.

As can be thus noted, the fish are lifted bodily from a point below the obstruction, shown as the dam $f$, and are kept at least partially submerged in water until they are released in a chute above said stream. The power necessary for moving said conveyor paddles $g$ is preferably supplied also by the head of water caused by said dam $f$. As is shown in Fig. 3, I also provide a flume $k$ which empties into a water wheel $l$ connected to the shaft $m$ carrying sprockets $m'$ upon which the conveyor chains $n$ are mounted.

It is thus evident that the devices shown are adapted to be actuated by the velocity of the stream up which the fish are to be lifted. By arranging said fish-conveying means so that the fish will at least be partially submerged, said devices tend to eliminate injury to the fish and thus permit them to reach their spawning ground above the object, which would otherwise prove an obstruction to their movement up stream.

I claim:

In a fish ladder of the character described, lifting devices comprising a rotatable fish wheel having an axially arranged discharge, and a peripherally arranged inlet, an inclined chute, said discharge emptying into said inclined chute, the latter having conveying mechanism therein, the upper end of said chute extending a substantial distance upstream, for the purpose described.

JOHN F. ALBRIGHT.